United States Patent [19]

Holmes et al.

[11] 4,266,690

[45] May 12, 1981

[54] WELDING ELECTRODE DISPENSER

[75] Inventors: Gordon W. Holmes, Mississauga; William Marykuca, Stoney Creek, both of Canada

[73] Assignee: Red-D-Arc International Inc., Hamilton, Canada

[21] Appl. No.: 14,958

[22] Filed: Feb. 26, 1979

[30] Foreign Application Priority Data

May 31, 1978 [GB] United Kingdom ............ 25018/78

[51] Int. Cl.³ .............................................. B65G 61/00
[52] U.S. Cl. .................................... 221/254; 221/267; 221/268; 221/310; 221/204
[58] Field of Search ............. 221/268, 303, 267, 204, 221/202, 200, 254, 310

[56] References Cited

U.S. PATENT DOCUMENTS

| | | | |
|---|---|---|---|
| 905,003 | 11/1908 | Sahlin | 221/204 |
| 1,034,318 | 7/1912 | Sobretto et al. | 221/267 X |
| 2,074,674 | 3/1937 | Sadjian | 221/267 X |
| 2,251,489 | 8/1941 | Koziel | 221/200 |
| 2,657,109 | 10/1953 | Reece | 221/204 |
| 2,873,047 | 2/1959 | Cepero | 221/204 X |

*Primary Examiner*—Allen N. Knowles
*Attorney, Agent, or Firm*—Sim & McBurney

[57] ABSTRACT

A dispenser for welding electrodes is disclosed. The dispenser comprises a tubular casing having a first internal elongate tubular cavity for storage of a plurality of the welding electrodes for dispensing one at a time therefrom. A top end closure has an axial opening dimensioned to permit the passage of one only of the electrodes from the cavity upon manual actuation of an axially-reciprocal pusher rod engaging the lower end of the electrode. The axial opening is provided with a friction grip disc which normally closes the opening, permits the passage of an electrode therethrough but exerts a friction grip on a stationary partly-dispensed electrode to prevent the same from returning to the cavity.

18 Claims, 8 Drawing Figures

WELDING ELECTRODE DISPENSER

FIELD OF THE INVENTION

The present invention relates to containers for the dispensing of rod-like products, preferably welding electrodes.

BACKGROUND TO THE INVENTION

In the manufacture and sale of welding electrodes, care is taken to apply and preserve an even distribution of flux over the surface of the electrodes, and in the packaging of the electrodes, care is taken to minimize damage. Uniform flux distribution is important for maintaining consistent excellence in the welding process. If the flux coating is damaged or marred in any way, the quality of the weld suffers.

While much care and attention is paid to providing a product of high standard to the job-site, when the work location is reached, the electrodes are presently exposed to damage and deterioration before use. Welders at construction work sites, to conserve time, normally take with them a number of electrodes from the packaged supply to the job location, which may be at a remote area. The need for the welder to scale scaffolds, climb ladders and structural steel and squeeze into inaccessible locations presents a further time restraint and safety hazard.

The welder usually inserts this plurality of electrodes into a pocket from which they can easily fall out as a result of bending and movement of the welder or by dislodgment upon removing one electrode, causing damage to the electrodes. Furthermore, there is a potential for serious injury to others if the electrodes fall any distance on the work site. A loss of work time as well as the economic penalty of electrode loss also result, since the welder must replenish his supply.

Another problem which is encountered is damage to the flux surface by rapid absorption of atmospheric moisture, which results in a greatly reduced weld integrity. When such electrodes are used in welding, fissures and flaws develop in the weld which will often require expensive cut out of the weld and complete rewelding of the defective weld.

For this reason, electrodes are normally heated on site to drive off any associated moisture, oil, grease or other deleterious matter. However, once the electrodes have cooled sufficiently for handling by the welder, they are once again subject to deterioration from atmospheric moisture and even more so by adverse climatic conditions, such as, rain or snow, on construction sites.

SUMMARY OF INVENTION

The present invention provides a portable welding electrode dispenser which overcomes the problems of the prior art. A plurality of welding electrodes are enclosed in the dispenser until one is required by the welder, at which time it is rapidly and safely ejected from the dispenser. In this way, the electrodes are protected from potential damage until required for actual use, accidental dislodgment and the attendant hazards are eliminated, and the potential for moisture damage is minimized.

The dispenser is portable, reusable and may be attached to a belt around the welder's waist. The dispensing action is simple and may be effected using just one hand, a distinct safety feature at many precarious job site locations.

The dispenser comprises an elongate tubular casing having upper and lower coaxial elongate internal tubular cavities, the upper one for receiving a plurality of elongate welding electrodes or other elongate rigid rod-like articles therein to be dispensed one at a time therefrom. A top end closure is normally mounted to the casing enclosing the top end of the first cavity and a cavity separator disc is mounted inside the casing spaced from the top end closure to define the lower extremity of the first rod-receiving cavity and to separate the first cavity from the second cavity. The top end closure is selectively removable from its mounting on the casing to permit placing of a plurality of the rods in the first cavity at one time.

The top end closure has an opening axially located with respect to and in communication with the first cavity and dimensioned to permit the dispensing of one only of the rods from the first cavity at one time. The top end closure includes guide means for guiding an electrode to be dispensed to the axial opening for passage therethrough when being dispensed.

A rubber disc having a cross cut opening, or other suitable releasable friction grip means, is associated with the opening in the top end closure normally closing the opening against the ingress of atmospheric moisture, permitting a rod to pass therethrough under the influence of axially directed forces on the electrode and frictionally gripping a stationary electrode partly ejected from the dispenser by the application of the axially-directed forces to prevent the partly-ejected electrode from returning to the cavity under gravitational forces and enabling the partly-ejected electrode to be manually gripped for withdrawal the remainder of the way from the cavity.

A pusher rod is axially located in the second cavity for axial reciprocation with respect to the axis of the cavity and is received through an axial opening in the cavity separator disc for engagement with the lower end of one of the electrodes for ejection of the same through the top closure opening upon axial movement of the pusher rod through the cavity separator opening towards the top closure. Manual actuation means is provided external of the casing and connected to the pusher rod for actuation of the axial reciprocation of the pusher rod for ejection of an electrode from the first cavity.

A lower end cap is mounted to the casing at the opposite end from the top end closure and defines the lower end of the second cavity.

Once a plurality of welding electrodes has been ejected from the dispenser one at a time, the top end closure is again opened and a fresh plurality of electrodes placed in the first cavity. The dispenser is reusable for many pluralities of electrodes.

DESCRIPTION OF PREFERRED EMBODIMENT

Figures 1, 7, 8:
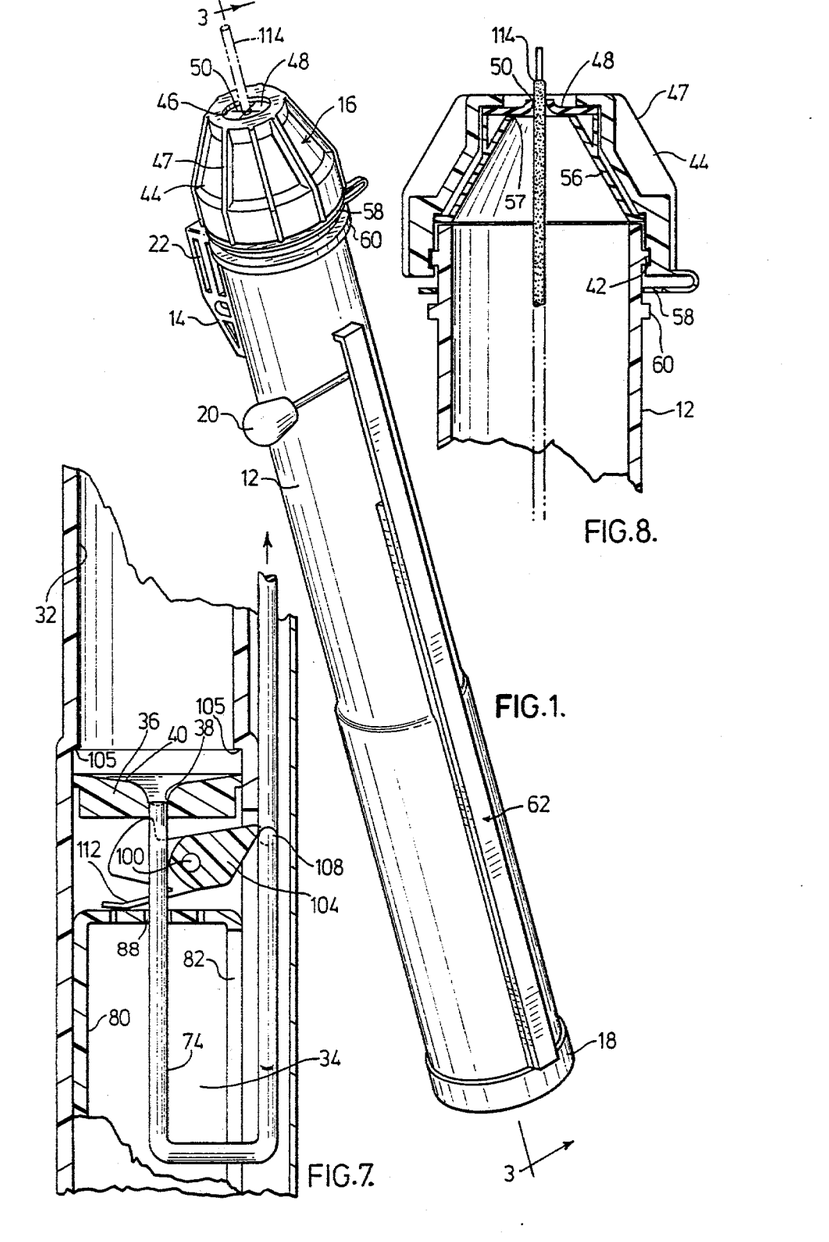
FIG. 1 is a perspective view of a welding electrode dispenser provided in accordance with one preferred embodiment of this invention.
FIGS. 4 to 7 are detail sectional views of the lower portion of the dispenser of FIG. 1 illustrating the relative locations of the parts at differing stages of motion of the pusher rod and actuator connector rod.
FIG. 8 is a sectional view of the upper portion of the dispenser illustrating the relative location of the component parts during dispensing of an electrode.
Figure 2:
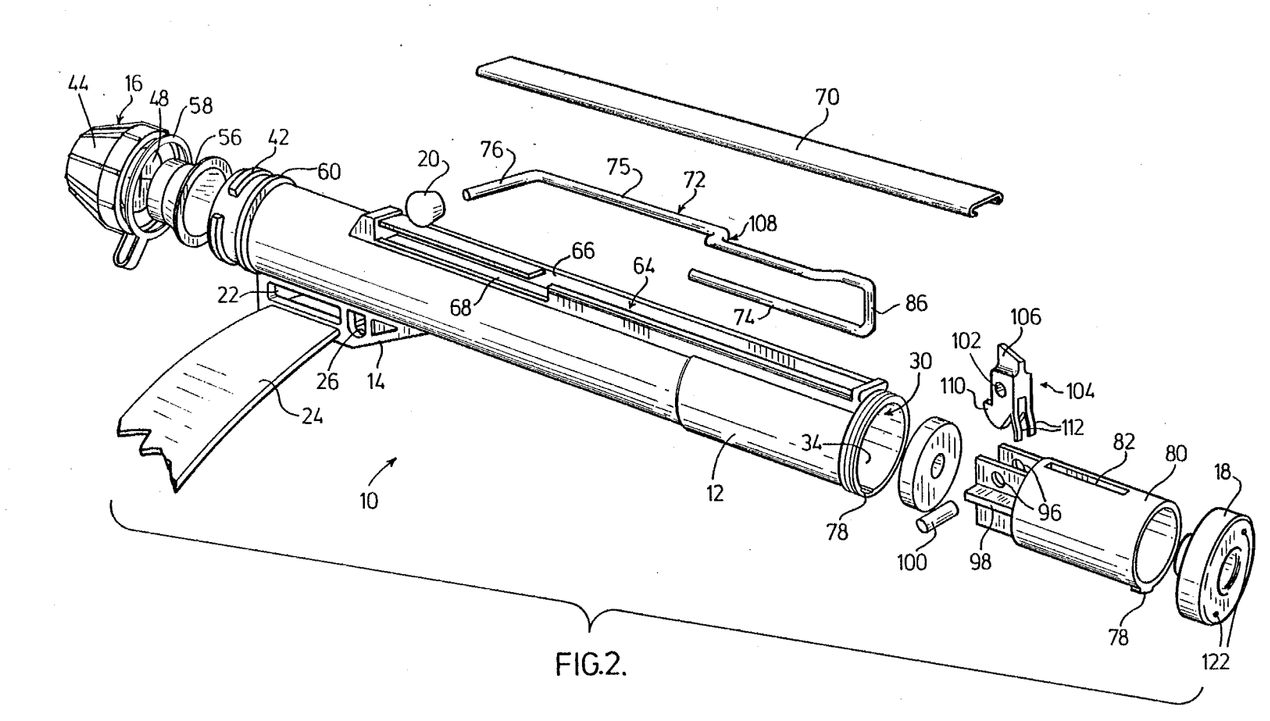
FIG. 2 is an exploded perspective view of the welding electrode dispenser of FIG. 1, illustrating the component parts of the device.
Figures 3, 4:
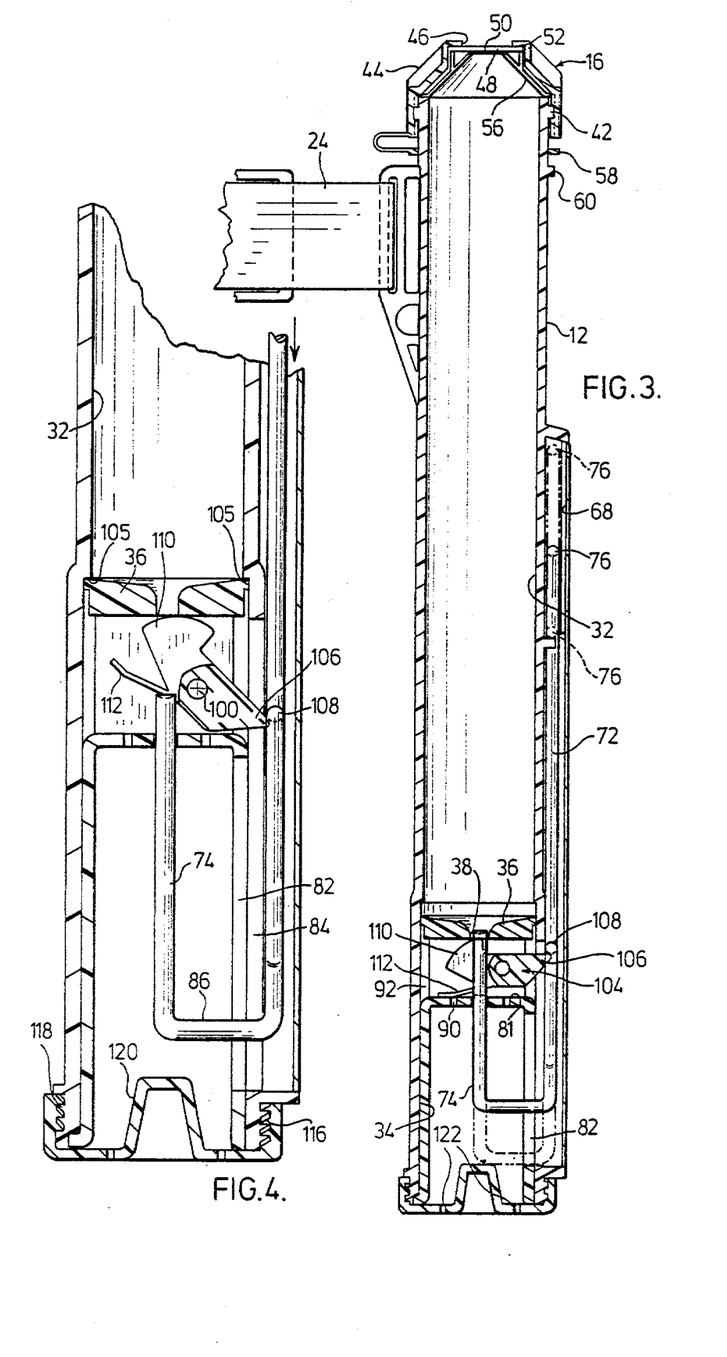
FIG. 3 is a sectional view of the welding electrode dispenser of FIG. 1 taken on line 3—3 of FIG. 1.

Referring to the drawings, a welding electrode dispenser 10 includes a substantially rigid tubular casing 12, a mounting member 14 located close to the upper end of the casing 12, a top end closure 16, a bottom cap 18 and an actuator knob 20. The various component parts of the dispenser 10, with the exception of the pusher and connector rods, friction grip disc and partition disc described below preferably are constructed of polymeric material, usually by molding, the rods and partition disc being metal and the friction grip disc being rubber. The parts, however, may be constructed of any other suitable construction material.

The mounting member 14 is provided with vertical slots 22 to receive a belt 24 or the like therethrough for holding the dispenser 10 about the welder's waist. The mounting member 14 serves to space the dispense 10 from the welder's body so that it may hang vertically down without interference from the wearer's hip. A round opening 26 is also provided through the mounting member to permit mounting on a nail or the like when the dispenser 10 is not in use, or hanging the unit from a rope in a convenient location at the work site.

The tubular casing 12 is hollow and has an elongate tubular cavity 30 extending from end to end thereof, separated into an electrode-receiving cavity 32 and a lower cavity 34 by a disc-like partition member 36 mounted in the cavity 30 for limited axial movement therein, as described below. The lower cavity 34 has a slightly larger diameter than the upper cavity 32.

While the tubular casing 12 and the tubular cavity 30 each has a circular cross-section, the present invention also includes other cross-sectional shapes independently for each of these items, such as, octagonal, hexagonal, or square. The term "tubular" as used herein is intended to include such alternative shapes.

The disc-like partition member 36 is provided with an axial opening 38 and a downwardly-dished rod-engaging surface 40.

The top closure member 16 normally closes the upper end of the electrode-receiving cavity 32 to enclose the plurality of electrodes therein but is screw-threadedly mounted to the casing 12 through screw threads 42. The top closure member 16 has a tapered outer surface 44 terminating in an opening 46 which is axially located with respect to the axis of cavity 30 when the top closure member 16 is assembled with the casing 12. The tapered outer surface 44 has a plurality of upstanding ribs 47 to increase strength and assist in rapid removal and replacement.

Mounted beneath the opening 46 is a rubber disc 48 having a cross-cut 50 cut in the centre thereof. The function of the cross-cut 50 is described below. The rubber disc 48 is sandwiched between the annular periphery 52 of the opening 46 and a lower annular support member 54, which in turn is a projection from a conical member 56 mounted internally of the closure 16. The conical member 56 acts as a guide and deflector for electrodes being dispensed from the cavity 32, as is apparent from the description of the operation below.

The cross-cut 50 in the rubber disc 48 combines with the axial opening 46 and the downstream opening 57 of the conical member 56 to provide an axial opening in the top end closure 16 which permits only one electrode to be dispensed at one time, although electrodes of various diameters may be placed in the dispenser 10.

A ring member 58 is integrally joined to the closure 16 and freely-turnedly mounted between the screw threads 42 and an adjacent raised member 60. The ring member 58 prevents accidental loss of the closure 16 when the dispenser 10 is opened to place a plurality of electrodes in the cavity 32.

The casing 12 has an elongate housing 62 formed on the outer surface thereof extending generally parallel to the longitudinal axis of the casing from the lower end cap 18 to adjacent to but spaced from the top end closure 16. The housing 62 includes a hollow portion 64 having an upper opening 66 extending the length thereof and a side slotlike opening 68 at one side thereof extending from the end of the housing 62 adjacent the top closure 16 part way towards the other end. The housing 62 further includes an elongate closure portion 70 extending the length thereof and closing the upper opening 66 when assembled.

The elongate housing 62 houses a connector rod 72 which establishes communication between the actuator knob 20 and a pusher rod 74 located axially of the cavity 30, the pusher rod 74 being capable of axial reciprocation as described below. The pusher rod 74 has a concave surface at its free end to engage the generally convex lower ends of welding electrodes.

The connector rod 72 includes an axially directed portion 75 and a transversely-directed portion 76 which projects through the slot 68, the slot 68 being of a length suitable to accommodate movement of the rod portion 76 during operation of the device, as described below.

Non-slidably and non-rotatably located in the cavity 34 by keyway elements 78 is a hollow tubular member 80 open at one end and closed at the end closest to the disc-like partition 36 by an integral end wall 81. The tubular member 80 has an elongate slot 82 formed in the side wall thereof aligned with an elongate slot 84 formed in the wall of the casing 12 in communication with the interior of the housing 62 to permit an inwardly radially-directed portion 86 of the connecting rod 72 to join with the lower end of the pusher rod 74 and to move axially of the casing 12 during operation of the dispenser 10.

The end wall 81 has an axial opening 88 therethrough in alignment with the opening 38 in the partition disc 36 through which projects the pusher rod 74. Other openings 90 may be provided in the wall 81 to permit small flux particles or other particulate matter to pass out of the dispenser 10 and not hinder proper operation.

Projecting from the end wall 81 of the hollow tubular member 80 towards the partition disc 36 is a pivot mount and stop member 92 consisting of parallel spaced walls 94 having aligned openings 96 therethrough and perpendicular support members 98. A pivot pin 100 is received through the aligned openings 96 and also through an opening 102 in a sprung cam element 104 to permit pivotal movement of the cam element 104 about the pivot pin 100.

The pivot mount 92 also acts as a locating and stop means for the partition disc 36 by way of engagement of one side of the disc 36 by the inner ends of the walls 94 and supports 98, the partition disc being movable out of engagement with the pivot mount 92 towards an annular shoulder 105 formed in the cavity 30.

The cam element 104 has a connector rod-engaging cam follower portion 106 which projects through the opening 84 in the casing 12 into engagement with a crank-like cam portion 108 of the connecting rod 72 and has a pair of spaced camming arms 110 for balanced engagement with the partition disc 36 to cause the same to rise towards the annular shoulder 105, as described in detail below. An integral leg member 112 extends from the arms 110 normally into touching engagement with the end wall 81. This leg member 112 acts as a spring to restore the cam element 104 to its rest position during the ejection of a rod 114 from the dispenser 10 as described below.

The end cap 18 encloses the lower end of the casing 12 and fixes the tubular member 80 in position in the cavity 30. The end cap 18 is mounted to the casing 12 by interference interengagement of ribs 116 of the cap with ribs 118 on the external wall of the casing 12.

The end cap 18 has an inwardly-axially directed frustoconical portion 120 to act as a lower stop member with respect to reciprocal motion of the pusher rod 74, as is apparent from the description of the operation of the dispenser 10 below.

The end cap 18 also has openings 122 therein to permit particulate matter passing out of the cavity 32 through opening 38 in the disc 36 and openings 90 in the wall 81 to pass out of the dispenser 10.

OPERATION

In operation, a plurality of welding electrodes 114 or other rigid rod-like elements is charged into the dispenser 10 through the opening at the upper end after removal of the top end closure 16. The cavity 32 usually has a longitudinal dimension which is substantially the length of the rods. The weight of the electrodes and the natural weight of the movable partition disc 36 causes the same to assume its position in engagement with the pivot mount 92.

When the top end closure 16 had been replaced on the casing 12, the electrodes are effectively sealed into the cavity 32 and the ingress of atmospheric or other moisture to the cavity 32 is prevented, and hence the prior art degradation of the flux resulting from the effect of moisture is avoided.

The electrodes 114 are protected from damage by the rigid casing 12 and it is not possible for one or more of the electrodes to be accidentally dislodged, so that the prior art difficulties and safety hazards noted above with current welding practice are overcome. The welder loads up the dispenser 10 from the packaged supply, attaches the dispenser 10 around his waist using the belt 24 and proceeds to the work site.

When an electrode 114 is required to be removed from the cavity 32, this is achieved by operation of the actuating knob 20. In the "rest" position (see FIG. 3), the pusher rod 74 is located in the axial opening 38 in the partition disc 36 on which sit the lower ends of the electrodes 114 in the cavity 32, the projection 106 of the cam element 104 touchingly engages the crank 108 in the connecting rod 72, and the rod projection 76 is located at a position spaced from the lower end of the slot 68.

The initial movement of the actuating knob 20 is downwardly, causing the rod projection 76 to move towards the lower end of the slot 68 and, through the interconnection via rod 72, the pusher rod 74 to move out of the opening 38 towards the stop 120. During this motion (see FIG. 4), the crank 108, through engagement with the projection 106, causes the cam element 104 to pivot about the pivot pin 100 which, in turn, causes the arms 110 to move and displace the disc 36 upwardly towards the shoulder 105, thereby also slightly raising the electrodes in the cavity 32. The pivoting of the cam member 104 and the movement of the disc 36 continue until the cam member 104 has rotated sufficiently to permit the crank 108 to pass the projection 106.

Figure 5:
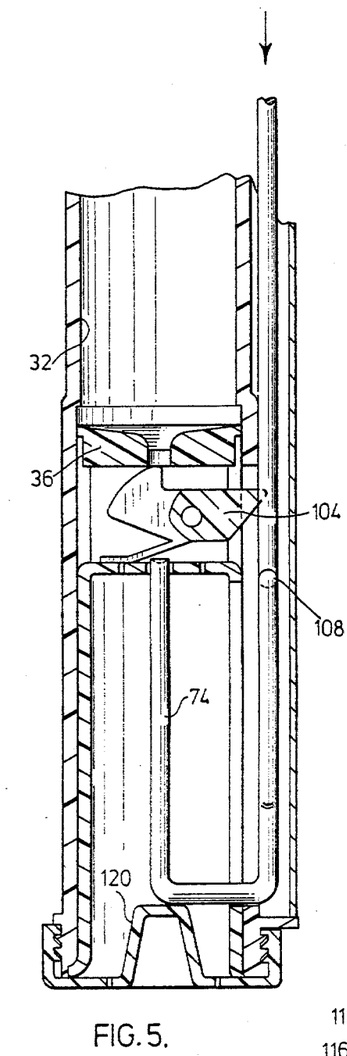
Figure 6:
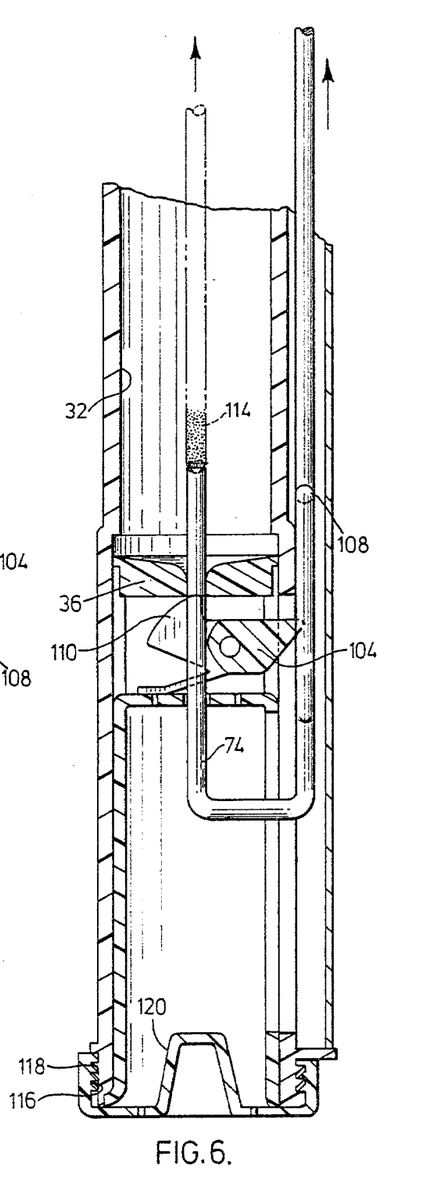

The pusher rod 74 continues to move downwardly until it engages the stop 120 (see FIG. 5). In the meantime, release of the pivoting force on the cam 104 results in the weight of electrodes on the movable partition disc 36 and its own natural weight rapidly restoring the disc 36 to its original position in engagement with the pivot supports 92 and also restoring the cam 104 to its rest position.

The rapid movement of the disc 36 in this way into engagement with the stationary pivot supports 92 imparts a mechanical shock, which shakes the electrodes and prevents jamming due to pattern formation. This action combined with the downwardly dished shape of the surface 40 of the disc 36 ensures that one electrode is positioned in alignment with the axial opening 38 for engagement by the pusher rod 74 ready for dispensing action.

The shaking action caused by the engagement of the cam element 104 and the disc 36 and subsequent release is a preferred feature of the invention since this ensures that an electrode is always located in the correct position for engagement by the pusher rod 74 and ejection from the dispenser. This mechanism may be omitted, however, where less foolproof operation may be acceptable.

Once the actuating knob 20 has reached the extremity of its downward movement, when the pusher rod 74 engages the stop 120, the knob 20 then is raised and, during this movement, the pusher rod 74 passes first through the position shown in FIG. 7 and then to the position shown in FIG. 3 with the pusher rod 74 projecting through the opening 38 into engagement with the lower end of an electrode 114. As the pusher rod 74 passes from the position shown in FIG. 5 to that shown in FIG. 3, the crank 108 engages the sloped underside of the projection 106 causing the cam member 104 to pivot about pivot 100 against the action of spring 112, as seen in FIG. 7. When the crank 108 passes beyond the projection 106, the cam 104 is restored to the rest position shown in FIG. 3 by the resilient action of the spring 112.

The continued movement of the pusher rod 74 commences ejection of the engaged electrode 114, the conical insert member 56 causing the particular electrode to axially align with respect to the cross cut 50 in the rubber disc 48. The engaged electrode is pushed through the cross cut 50 and then through the opening 46 (see FIG. 8). The dimensioning of the pusher rod 74 and the downstream opening 57 in the conical insert 56 permits only one electrode 114 to be ejected through the cross cut 50 and the opening 46 at any one time. The disc 48 is prevented from distortion during this operation by its sandwiched position described above.

The axial movement of the pusher rod 74 continues until the connecting piece 86 engages the upper extremity of the slot 82, at which point the locations for the rod 74 and the rod projection 76 shown in dotted outline in FIG. 3 are reached and the electrode thereby is partly ejected from the cavity 32. The actuating knob 20 is now released and the pusher rod 74 falls back to the rest position shown in FIG. 3. The pusher rod 74 is maintained in this position by reason of the touching engagement of the crank 108 with the projection 106 and the touching engagement of the arms 110 with the disc 36.

The electrode 114 which is partially ejected by the action of the pusher rod 74 is prevented from falling back into the dispenser 10 upon release of the upward force when the actuating knob 20 is released by friction grip resilient engagement of the parted members of the cross cut 50 with the adjacent electrode. This friction grip engagement holds the partially ejected electrode in position for the welder to grip the electrode and draw the same the remainder of the way out of the dispenser 10 for use. Once the electrode 114 has been drawn the remainder of the way out, the resiliency of the members of the cross cut 50 restores the cross cut 50 to its closed position.

From this description of the action of the disc 48 and cross cut 50, it is apparent that any other convenient device may achieve the same function.

The welding electrodes, therefore, are stored in a sealed container until required and are readily and safely ejected therefrom one at a time using a simple one hand down and up movement of the actuating knob 20 and subsequent one hand withdrawal of the partially ejected electrode. Once the plurality of electrodes has been depleted, a new plurality may be placed in the cavity 32.

SUMMARY OF DISCLOSURE

In summary of this disclosure, the present invention, therefore, is directed to a dispenser for welding electrodes or other rigid rod-like articles having advantages with respect to conventional practice. Modifications are possible within the scope of this invention.

What we claim is:

1. A portable dispenser device for rigid elongate rod-like articles, preferably welding electrodes, comprising:
   an elongate casing having a first upper internal unobstructed tubular cavity for receiving a plurality of said articles therein to be dispensed one at a time therefrom and a second lower internal elongate coaxially-arranged tubular cavity;
   top end closure means having means defining an axial opening therein communicating with said first cavity and dimensioned to permit the passage of one only of said articles from said first cavity at one time, said top closure means normally being mounted at the upper end of said casing enclosing the upper end of said first cavity but being selectively removable therefrom to permit the placing of a plurality of of said articles in said first cavity at one time;
   said top closure means including guide means for guiding an article to be dispensed to said axial opening for passage therethrough and releasable friction grip means associated with said opening to frictionally grip a stationary partially ejected article to prevent said article from returning to said first cavity;
   cavity separator means mounted inside said casing in spaced relationship with respect to said top closure means to define the lower extremity of said first cavity and to separate said first cavity from said second cavity, said cavity separator means having an axial opening therein;
   said cavity separator means being slidably mounted in said second cavity for reciprocal movement from engagement with stop means located within said second cavity towards said top closure means;
   axially reciprocal pusher rod means axially located in said second cavity for extension through the latter opening for engagement with the lower end of one of said articles for ejection of the same through said top closure opening upon axial movement of said pusher rod means through the separator means opening towards said top closure means;
   manual actuator means external of said casing and operably connected to said pusher rod means for actuation of said axial reciprocation for ejection of an article from said first cavity;
   lower end cap means mounted to said casing at the opposite end thereof from said top end closure means and defining the lower extremity of said second cavity;
   cam means located in said second cavity and constructed to effect movement of said cavity separator means towards said top closure means; and
   cam actuator means operably connected to said manual actuator means;
   said cam means being pivotally mounted in said cavity and including a front cam member capable of engaging said cavity separator means upon pivotal movement of said cam means in one direction to effect said cavity separator means movement towards said top closure means and cam follower means capable of engaging said cam actuator means for pivotal movement in either direction.

2. The device of claim 1 wherein said top closure means has a frustoconical external shape terminating in an axial opening therein, said guide means is constituted by a frustoconical member mounted internally of said top closure means and having a downstream axial opening aligned with and spaced from said first-mentioned axial opening, and said friction grip means is constituted by a disc of resiliently flexible material substantially non-deformably mounted between the inner annular periphery of said first-mentioned axial opening and said conical member, said disc having resiliently sealable opening means axially aligned with said first- and second-mentioned openings.

3. The device of claim 2 wherein said resiliently sealable opening means is constituted by a cross cut in said disc.

4. The device of claim 1 wherein said manual actuator means is operably connected to said pusher rod means by a connecting rod including a portion thereof constituting said cam actuator means.

5. The device of claim 2 wherein said frusto-concial external shape of said top closure means has a plurality of axially-directed circumferentially-spaced ribs upstanding from the surface thereof.

6. The device of claim 2 wherein said top closure means includes connector means connecting said top closure means to said casing whereby said top closure means remains attached to said casing when removed from enclosure of the upper end of the cavity.

7. The device of claim 1 wherein said connector means includes an annular member rotatably mounted on said casing adjacent said upper end thereof and flexible elongate tab means integrally joining said annular member and said top closure means.

8. A portable dispenser device for rigid elongate rod-like articles, preferably welding electrodes, comprising:

an elongate casing having a first upper internal unobstructed tubular cavity for receiving a plurality of said articles therein to be dispensed one at a time therefrom and a second lower internal elongate coaxially-arranged tubular cavity;

top end closure means having means defining an axial opening therein communicating with said first cavity and dimensioned to permit the passage of one only of said articles from said first cavity at one time, said top closure means normally being mounted at the upper end of said casing enclosing the upper end of said first cavity but being selectively removable therefrom to permit the placing of a plurality of of said articles in said first cavity at one time;

said top closure means including guide means for guiding an article to be dispensed to said axial opening for passage therethrough and releasable friction grip means associated with said opening to frictionally grip a stationary partially ejected article to prevent said article from returning to said first cavity;

cavity separator means mounted inside said casing in spaced relationship with respect to said top closure means to define the lower extremity of said first cavity and to separate said first cavity from said second cavity, said cavity separator means having an axial opening therein;

axially reciprocal pusher rod means axially located in said second cavity for extension through the latter opening for engagement with the lower end of one of said articles for ejection of the same through said top closure opening upon axial movement of said pusher rod means through the separator means opening towards said top closure means;

manual actuator means external of said casing and operably connected to said pusher rod means for actuation of said axial reciprocation for ejection of an article from said first cavity;

lower end cap means mounted to said casing at the opposite end thereof from said top end closure means and defining the lower extremity of said second cavity;

said casing having an elongate narrow hollow housing formed on the outer surface thereof and extending parallel to the axis of the cavities from adjacent the lower end cap means to adjacent but spaced from the top closure means and having an elongate slot formed therethrough in communication with the interior of said housing substantially for the axial length of said second cavity;

said manual actuator means being operably connected to said pusher rod means by rigid connecting rod means having a mid-portion slidably located within said housing, a first end portion extending from one end of said mid-portion out of said housing and connected to said manual actuator means and a second end portion extending from the other end of said mid-portion through said elongate slot to integral connection with the end of said pusher rod means remote from said cavity separator means.

9. The device of claim 8 wherein said first end portion of said connecting rod means extends generally perpendicularly from said one end of said mid-portion through an elongate slot in one side of said hollow housing dimensioned to permit the extremities of movement of said pusher rod means and terminates in a knob constituting said manual actuator means and said second end portion of said connecting rod means extends generally perpendicularly from the other end of said mid-portion.

10. The device of claim 8 wherein said cavity separator means is slidably mounted in said second cavity for reciprocal movement between engagement with stop means located in said second cavity and a location spaced from said stop means towards said top closure member, and including cam means pivotally mounted in said second cavity to pivot support means to effect cammed movement of said cavity separator means from said stop means towards said spaced location, and wherein said pivot support means have surfaces constituting said stop means, said cam means includes a camming element to one side of the pivot capable of engagement with said cavity separator means upon pivotal movement of said cam means in one direction from a rest position to effect said cammed movement and a cam follower element to the other side of the pivot extending through said slot in said casing for engagement with a cam member associated with said mid-portion of said connecting rod means arranged to cause said cam means to rotate in said one direction and thereby induce said cammed movement during movement of said pusher rod means in said second cavity away from said axial opening in said cavity separator means until said cam member is disengaged from said cam follower element, whereby the gravitational forces acting on said articles located in said first cavity in engagement with said cavity separator means cause said cavity separator means to resume its position in engagement with said stop means and said cam means to resume its rest position, said cam member also being arranged to cause said cam means to rotate in the opposite direction from said rest position during movement of said pusher rod means in said second cavity from the spaced position with respect to said axial opening towards the axial opening, said cam means also including means resiliently restoring said cam means to its rest position following rotation in said other direction.

11. The device of claim 10 wherein said cavity separator means has a downwardly-dished surface facing said first cavity for receiving the lower end of said plurality of rod-like articles thereon.

12. The device of claim 10 wherein said cam member associated with said mid-portion of said connecting rod means is constituted by a kink or crank in said mid-portion.

13. The device of claim 10, 11 or 12 wherein said second cavity has a slightly larger diameter than the first cavity whereby annular shoulder means is provided at the integral join of the cavities, said annular shoulder means constituting the limit of cammed movement of said cavity separator means from said stop means.

14. The device of claim 10 wherein said pivot support means extends axially from a disc-like integral end wall of a hollow sleeve member open at the end opposite to said wall slidably received in said second cavity and being non-rotatably and non-slidably mounted therein in abutting relationship with said lower end cap means, said sleeve member having an axial opening therein through which said pusher rod means projects and a slot formed in the wall therein and located in alignment with said casing slot and receiving said second end portion of said connecting rod therethrough.

15. The device of claim 14 wherein said end wall has at least one additional opening therein and said lower end cap means has at least one opening therein, said latter openings permitting particles passing out of said first cavity through said axial opening in said cavity separator means to pass out of said dispenser and thereby avoid interference with the operation of the dispenser by said particles.

16. The device of claim 14 wherein said lower end cap means includes stop means defining the lower extremity of movement of said pusher rod means.

17. The device of claim 1 or 8 wherein said casing and said first and second cavities each has a generally circular cross-section.

18. The device of claim 1 or 8 wherein said casing includes integral external mounting means for mounting said casing on a workman's belt.

* * * * *